(12) United States Patent
Schomann

(10) Patent No.: US 8,371,337 B2
(45) Date of Patent: Feb. 12, 2013

(54) QUICK RELEASE TIRE STEM CAP

(76) Inventor: Mark Anthony Schomann, Clinton Corners, NY (US)

( * ) Notice: Subject to any disclaimer, the term of this patent is extended or adjusted under 35 U.S.C. 154(b) by 0 days.

(21) Appl. No.: 13/134,807

(22) Filed: Jun. 17, 2011

(65) Prior Publication Data

US 2012/0318375 A1   Dec. 20, 2012

(51) Int. Cl.
*F16L 55/10* (2006.01)
(52) U.S. Cl. .................. 138/89.1; 138/89; 138/89.3
(58) Field of Classification Search .............. 138/89, 138/89.1–89.4
See application file for complete search history.

(56) References Cited

U.S. PATENT DOCUMENTS

| | | | | |
|---|---|---|---|---|
| 1,473,032 A * | 11/1923 | Freedlander | ................. | 138/89.1 |
| 1,480,701 A * | 1/1924 | Staggers | ..................... | 138/89.1 |
| 1,488,906 A * | 4/1924 | Bowden | ...................... | 138/89.1 |
| 1,692,621 A * | 11/1928 | Buckman | .................... | 138/89.2 |
| 2,636,065 A * | 4/1953 | Fiske | ............................ | 439/892 |
| 2,672,160 A * | 3/1954 | Wrabel | ....................... | 138/89.2 |
| 3,332,515 A * | 7/1967 | Borah | ......................... | 184/88.2 |
| 5,417,247 A * | 5/1995 | Tarui et al. | .................. | 138/89.2 |
| 2004/0216793 A1 * | 11/2004 | Keller | ......................... | 138/89.1 |

* cited by examiner

*Primary Examiner* — Patrick F Brinson
(74) *Attorney, Agent, or Firm* — Frank B. Arenas, Esq.

(57) ABSTRACT

An article of manufacture, a quick cap device for use with a tire valve stem, which may be a pushed-to-put-on/squeezed-to-remove tire valve stem cap.

Optional interior female threads and grooves may also be used with versions of the invention.

9 Claims, 6 Drawing Sheets

QUICK RELEASE TIRE STEM CAP

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

1. Field of the Invention

Versions and embodiments of the present invention relate generally to tires. Particularly, embodiments of the invention relate to automobile tires and methods for using thereof. More particularly, versions of the invention relate to racing cars for competition and saving time when servicing race cars in pit stops. Specifically, versions of the invention relate to caps that may be quickly changed (removed and replaced from the tire stem) and new, useful and unobvious versions thereof.

2. Description/Background of the Related Art

The art discussed herein is not to be considered admitted prior art but is presented to more clearly discuss and describe what is still lacking in the earlier art.

Tire stem caps are conventionally made of metals, plastic or other hard materials that contain female threads on the inside of the cap to screw onto the male threads on the tire valve stem. Tire stem caps are necessary to prevent dirt, mud, water, ice, foreign objects and debris from damaging or interfering with the tire needle valve. Prior art caps must be manually un-screwed to adjust the tire pressure and then screwed by hand onto the tire valve stem, which takes more time than versions of this invention.

In the auto racing industry, time is money, especially when it comes to track time; depending on the testing venue, track time can be as much as thousands of dollars per minute. In automobile racing, the tires are extremely important for traction of the race car to the race track. Tire air pressure is critical for improved performance of the race car to win the race ahead of all other competitors. One of the most important tuning aids for setting up a competitive race car is tire pressure. In practice and/or in actual races, tire pressure is checked and adjusted as needed to ensure optimum performance each pit stop. It is very time consuming for the crew member to thread on and off the valve stem caps on the wheels. Sometimes another crew member will go ahead of the pressure checker and take the caps off and then follow behind and put them back on to speed things up.

Precious seconds are wasted in this conventional method using conventional tire caps being removed by screwing and put back on by screwing. What is needed is a quick release tire stem cap and quick replacement of same to save time. Versions of this invention solve the problems of the prior art and save time, which on a race track can mean winning or losing the race, giving the user of versions of this invention a competitive edge and new results not found in the prior art.

No tire stem cap device and/or system is known to this inventor that addresses the deficiencies in the earlier art as is used in conventional tire stem caps. This new, useful and unobvious invention and concept, in various embodiments and versions, accomplishes this much needed advantage and new result of increased time savings of removing/replacing conventional tire stem cap devices and/or systems.

SUMMARY OF THE INVENTION

Advantages of versions of the present invention include avoidance and solving of at least one, some, most if not all of the above problems by allowing a push-to-put-on/squeeze-to-remove tire valve stem cap, resulting in greatly reducing time to check tire pressure, especially for race cars.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
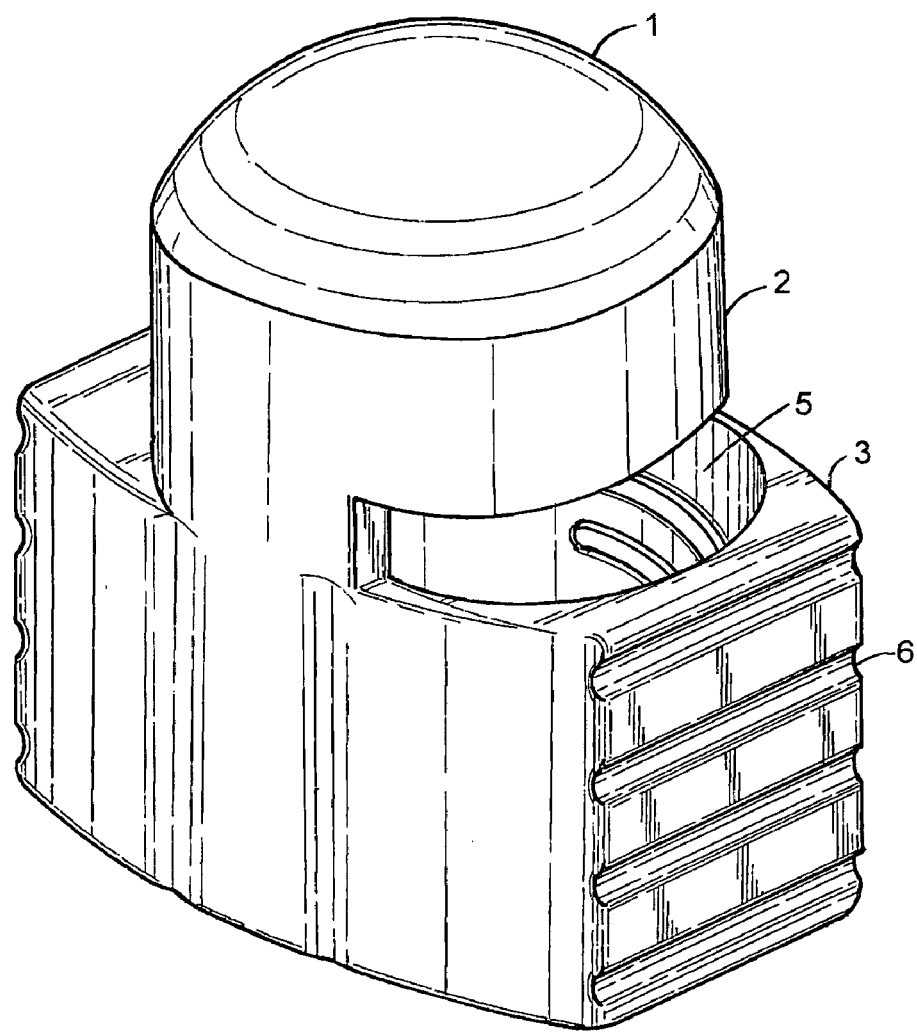
FIG. 1 is a perspective view of a preferred embodiment version of the invention.
Figure 2:
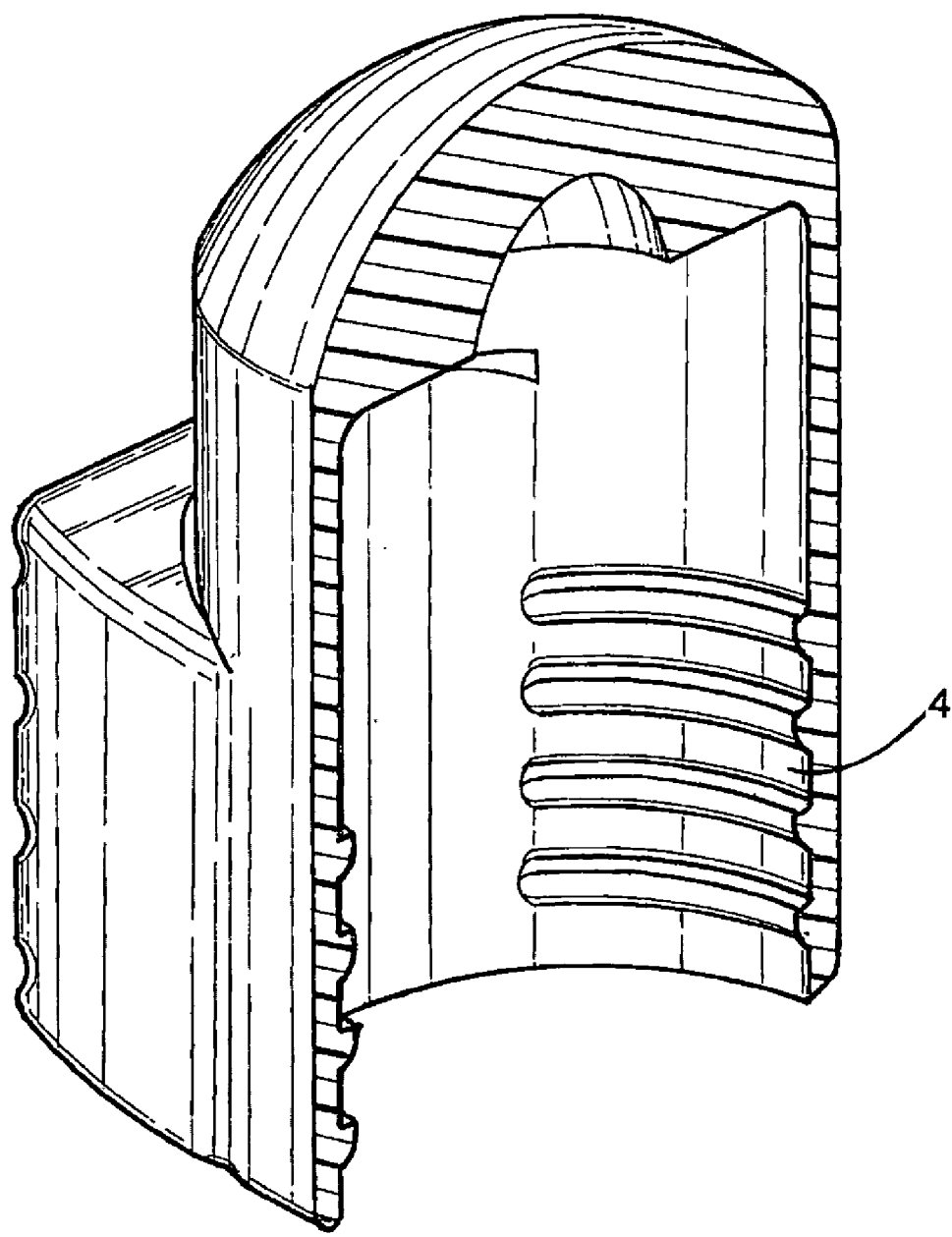
FIG. 2 is a perspective section view of a version of the invention.
Figure 3:
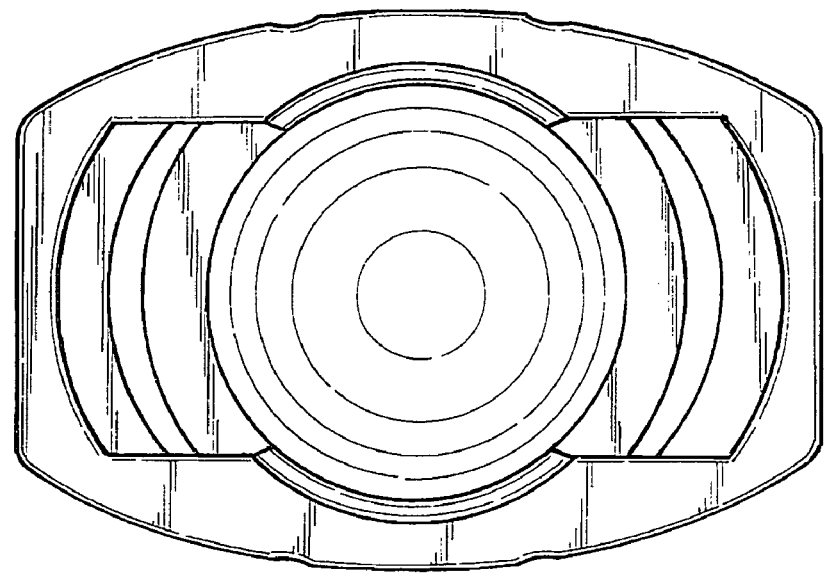
FIG. 3 is a bottom view of a version of the invention.
Figure 4:
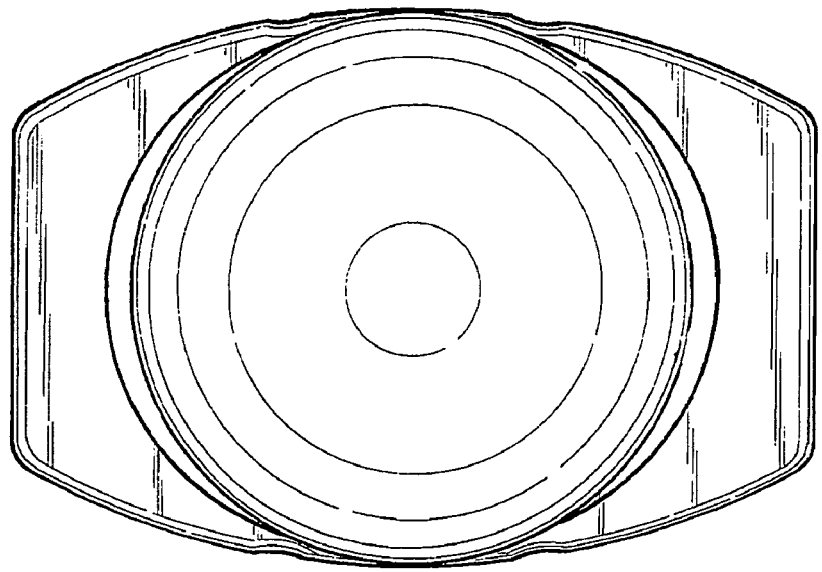
FIG. 4 is a top view of a version of the invention.
Figure 5:
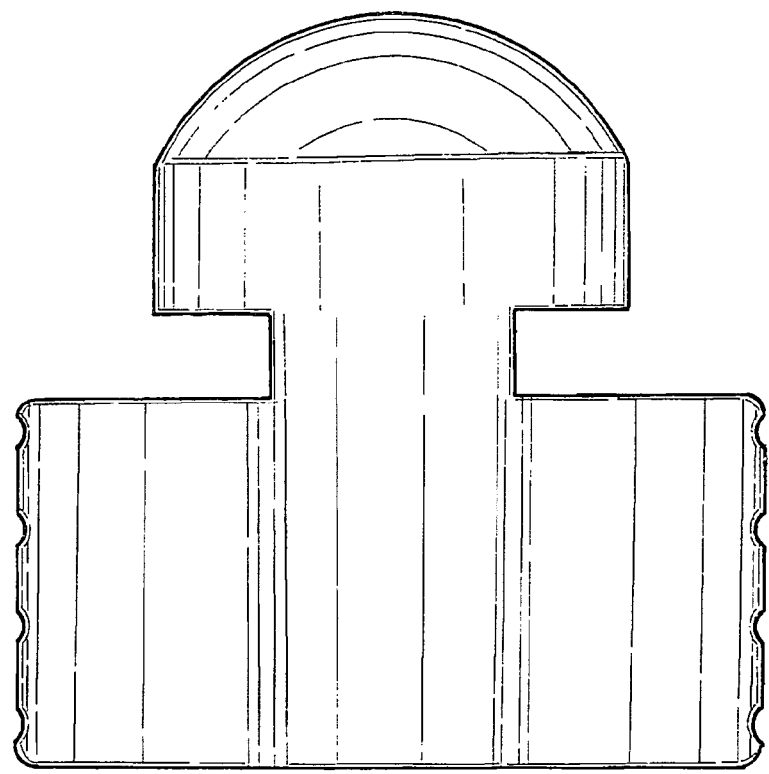
FIG. 5 is a side view of a version of the invention.
Figure 6:
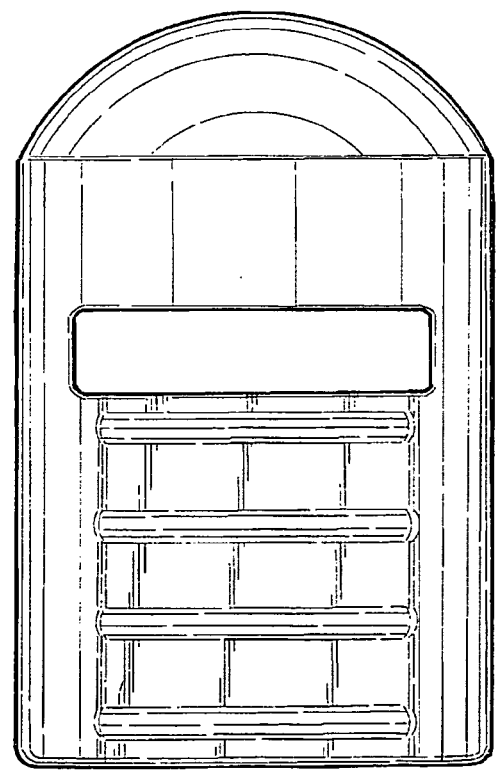
FIG. 6 is another side view of a version of the invention.

While the present invention will be described with reference to the details of the embodiments of the invention shown in the drawings (and some embodiments not shown in the drawings), these details are not intended to limit the scope of the invention. As would be known by one of average skill in the art, such as a tire designer/manufacturer and/or tire valve stem designer/manufacturer and/or, tire valve stem cap designer/manufacturer and/or race car tire equipment designer/manufacturer and/or race engineer/pit crew, modifications may be made that are intended to be within the scope of versions of the invention.

DETAILED DESCRIPTION OF THE PREFERRED EMBODIMENT

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that "or" is an inclusive "or" to include all items in a list and not intended to be limiting and means any combination or permutation of all, one, some, a plurality or none of each of the item or list mentioned. It is also understood that "include(s)" and/or "including" means "including but not limited to" any combination or permutation of all, one, some, a plurality or none of each of the item or list mentioned.

The core of the version of the preferred basic embodiment of the invention is depicted in FIGS. 1-6. The basic component is a body or cap, which may be any suitable shape but illustrated herein as a hollow dome 1 of suitable diameter and height fabricated such that the dome base 2 and dome base opening 5 has an elongated portion 3 on at least one axis of the dome base 2. The dome base 2 and elongated portion 3 are shaped such that the dome may be pushed onto the tire valve stem male threads and adhere via friction to the tire valve stem. The elongated portion 3 is made of any suitable material, metal and/or rubber and/or pliable plastic, comprising an elastic spring means (or elastic means) such that when squeezed between the thumb and forefinger of the operator on the longitudinal axis from the dome, the elastic portion of the dome creates an oblong opening which releases the cap from the tire valve stem threads.

Optional components are interior groove(s) 4 for additional friction with the tire valve stem if desired and exterior groove(s) 6 for enhanced gripping with gloves and/or bare hands in cold weather. "Quick cap" is hereby defined as a push-to-put-on/squeeze-to-remove tire valve stem cap.

The elastic means may be of any suitable type—rubber (both natural and/or synthetic), plastic, spring, spring metal, coil and/or any suitable elastic material. Elastic means is hereby defined as able to return to its original shape and/or form without operator input after being forced out of its original shape and/or form. Malleable metal is hereby defined as metal that does not return to its original shape and/or form without operator input after being forced out of its original shape and/or form.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the operator.

At least one of the basic components is necessary but a plurality may be utilized if desired for different versions of the invention. This basic embodiment replaces the conventional tire stem caps in the conventional art. This great improvement over the prior art expands greatly the operator's control of the tire stem cap, producing new results and reducing the change-time (on tire stem/off tire stem) of the conventional caps when used.

Versions of the invention may be made with any and all suitable materials desired as needed for the appropriate use and is not limited by the type of materials that may be used. Versions are all scalable and may be made any suitable size; large, small and/or any size as desired.

A preferred embodiment uses plastics and plastic injection molding techniques well know in the art. These non-metallic materials include, among others, conventional polymers such as, for example, polystyrene, polycarbonate, polyurethane, polyethylene, phenol formaldehyde resins, polybutylene, Teflon and the like.

Plastics (any one of a large and varied group of materials consisting wholly or in part of combinations of carbon with hydrogen, oxygen, nitrogen and other organic and inorganic elements; while solid in the finished state, at some stage in its manufacture, it is made liquid, and thus capable of being formed into various shapes, usually through the application of heat and/or pressure), such as monomer (one unit—the building block for polymer molecules) or polymer (many monomer units strung together to make long molecules) used in polymerization (the process of combining short molecules to make long molecules) may be used.

Thermoplastics (plastics that can be repeatedly softened and hardened by heating and cooling) as well as Thermosets (plastics that are cross-linked during polymerization and cannot be softened without degrading some linkages) may also be used.

Thermoplastic resin types such as crystalline (thermoplastics containing areas of dense molecular alignments known as crystallinity), amorphous (thermoplastics with no crystallinity in the solid state), liquid crystal polymers (LCPs) (stiff, rod-like structures organized in large paralleled arrays in both melted and solid states) may also be used.

Versions of the device may be made of biodegradable materials to allow the cap to be disposable in a "green" manner and/or recycled. This version could include the elastic portion being a malleable metal that would not return to its original shape but only used once and disposed in a green manner and/or recycled.

All components may be referenced in plural for convenience, as only at least one of all components are necessary, if desired, for proper operation and use in other embodiments. Ideally, all components (or some components) are injection molded from non-metallic materials (plastic and/or rubber, including natural and/or synthetic rubber and/or rubber-like compositions) as previously mentioned above.

To make the invention in a basic embodiment, one skilled in the art would follow the instructions and drawings disclosed in this document and proceed as follows: use injection molding techniques, well known in the art, to fabricate a version of the device as shown in the FIGS. 1-6. The device should be sized properly for the intended tire valve stem to be capped and made of suitable elastic material that will allow the desired "push-to-put-on/squeeze-to-remove" operation as described herein.

The primary requirements for successful use of versions of the invention are the design parameters set by the equipment manufacturer (tire, tube, stem valve). These requirements may vary from one particular equipment manufacturer to another.

To use the invention in this embodiment, one skilled in the art would squeeze the elongated portion between the thumb and index finger to remove the quick cap, check tire pressure, add or release air as desired to the tire, then push the quick cap on with thumb/index finger as rapidly as desired under the circumstances, for instance in a competition car race where time is at a premium to win the race.

Figure 7:
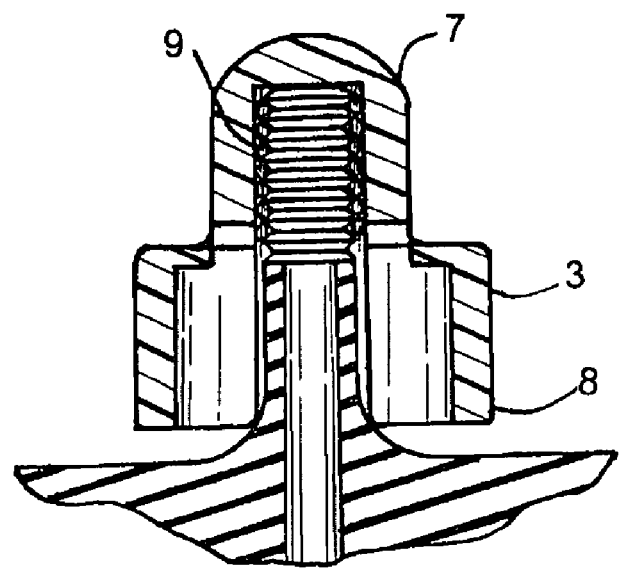
FIG. 7 is section view of an alternate version of the invention showing layers.
Figure 8:
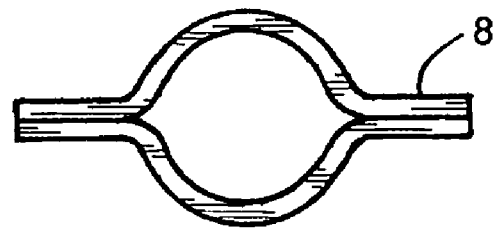
FIG. 8 is a top view of a version of the opposing spring steel pieces used in alternate embodiments of the invention.

Another version is shown in FIG. 7. This version uses at least one layer of suitable flexible elastic material 7 (with optional second layer of suitable flexible elastic material 9—a plurality of layers may be used if desired) formed such that the quick cap may be pushed on to adhere to the male tire stem valve threads via friction only and then squeeze the elongated portion 3 to remove. Optionally, the elongated portion 3 may be suitably shaped opposing spring steel pieces 8 as shown in FIG. 8, alone or in combination with a flexible material. The spring steel pieces may be integrated into the base of the cap or attached separately in alternate versions.

Figure 9:
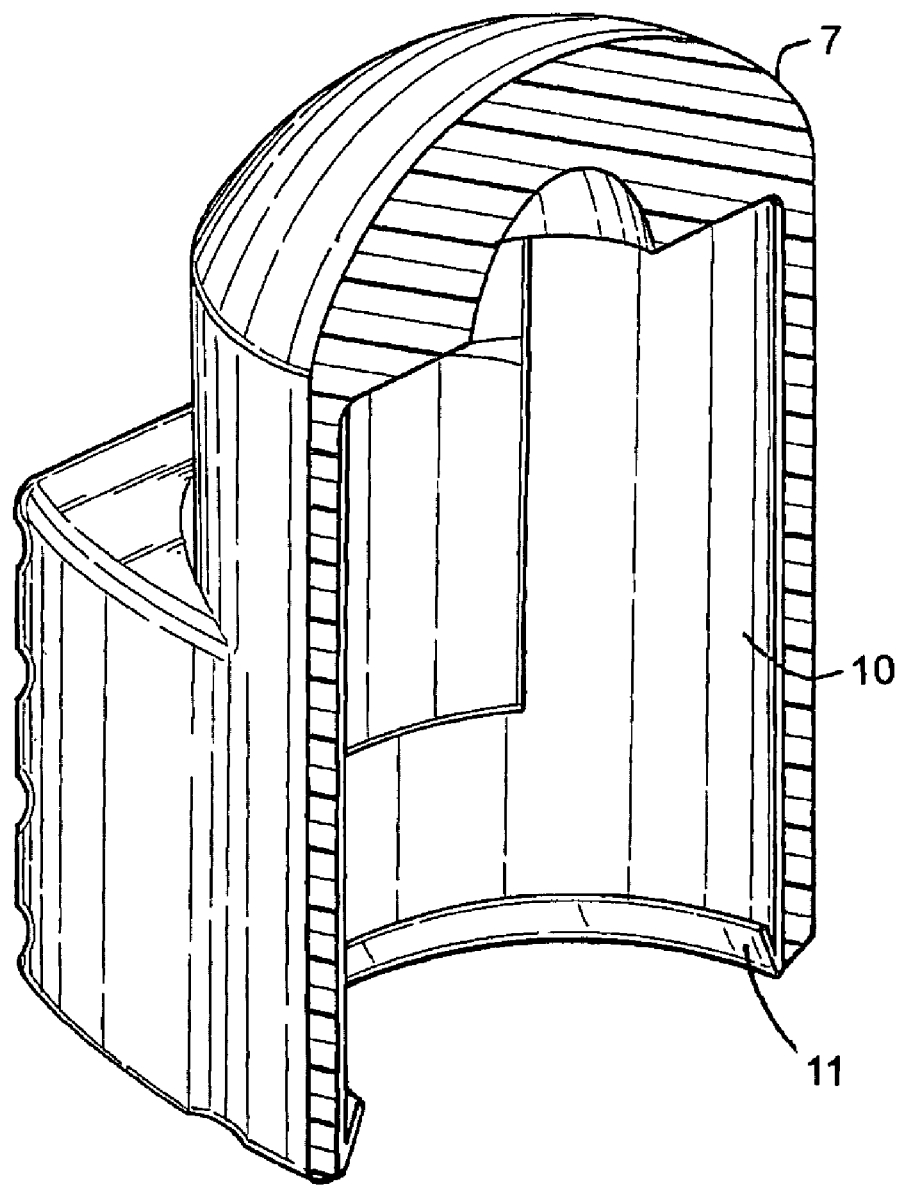
FIG. 9 is a perspective section view of another version of the invention showing layers.

Another version, shown in FIG. 9 for example only, uses at least one outer layer of suitable flexible elastic material 7 with an inner layer of metallic material 10 and optional lip 11 for gripping the tire valve stem base. Or, the metallic material 10 could be used as the outer layer and the suitable flexible elastic material 7 as the inner layer, as desired with or without the optional lip 11. The lip 11 may be any suitable shape and also be integrated into and/or combined with the suitably shaped opposing spring steel pieces 8. A plurality of layers can be used with elastic, plastic and/or metallic layer(s) in any combination as desired by the user (or operator) with any suitable material(s). Malleable metal also may be used in versions of the invention, alone or in combination with other materials.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function(s), instruction(s), component(s), application(s), interaction(s), item(s), product(s), good(s), group(s) and sub-group(s) as might be desirable or useful to someone skilled in the art.

As will be apparent to persons skilled in the art, such as a person in the tire designer/manufacturer and/or tire valve stem designer/manufacturer and/or, tire cap designer/manufacturer and/or race car tire equipment designer/manufacturer and/or race engineer/pit crew, manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. An article of manufacture, a quick cap device for use with a tire valve stem, comprising:
    at least one hollow body means, and;
    at least one opening in the hollow body means, further comprising an elongated elastic means at the opening in the hollow body means;
    further comprising at least one interior groove integrated into the elongated elastic means;
    further comprising at least one exterior groove disposed on the elongated elastic means;
    further comprising a lip integrated into or onto the elongated elastic means;
    further comprising the elongated elastic means further comprising suitably shaped opposing spring steel means;
    wherein the hollow body means may be pushed onto a tire valve stem and the elongated elastic means squeezed to remove the hollow body means from the tire valve stem.

2. The device of claim 1 further comprising malleable metal or biodegradable materials.

3. An article of manufacture, a quick cap device for use with a tire valve stem, comprising:
    at least one hollow dome of suitable diameter, height and thickness, and;
    further comprising at least one dome base, and;
    further comprising at least one dome base opening, and;
    further comprising at least one elongated elastic portion on at least one axis of the dome base;
    further comprising at least one interior groove integrated into the elongated elastic portion;
    further comprising at least one exterior groove disposed on the elongated elastic portion;
    further comprising the elongated elastic portion further comprising suitably shaped opposing spring steel pieces;
    wherein the hollow dome may be pushed on a tire valve stem and the elongated portion squeezed to remove the hollow dome from the tire valve stem.

4. The device of claim 3 further comprising at least one layer of suitable elastic material.

5. The device of claim 3 further comprising at least one layer of rigid material.

6. The device of claim 3 further comprising at least one layer of metallic material.

7. The device of claim 3 further comprising a plurality of layers of suitable materials.

8. The device of claim 3 further comprising biodegradable materials.

9. The device of claim 3 further comprising the elongated elastic portion further comprising a malleable metal.

* * * * *